Nov. 11, 1930.　　　J. H. MOYER　　　1,780,979
ARTIFICIAL PORCELAIN ROOT TOOTH
Filed July 12, 1923
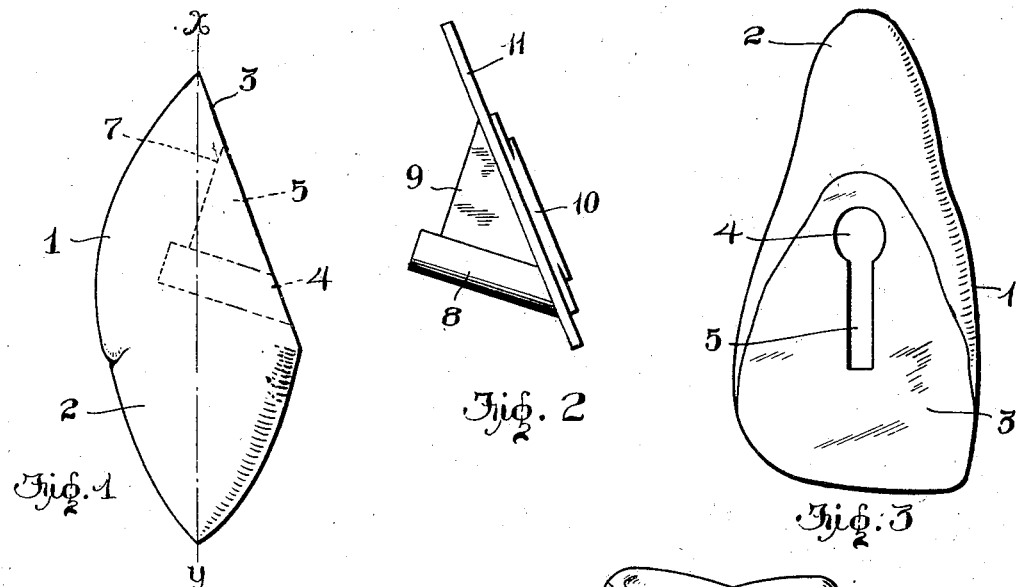
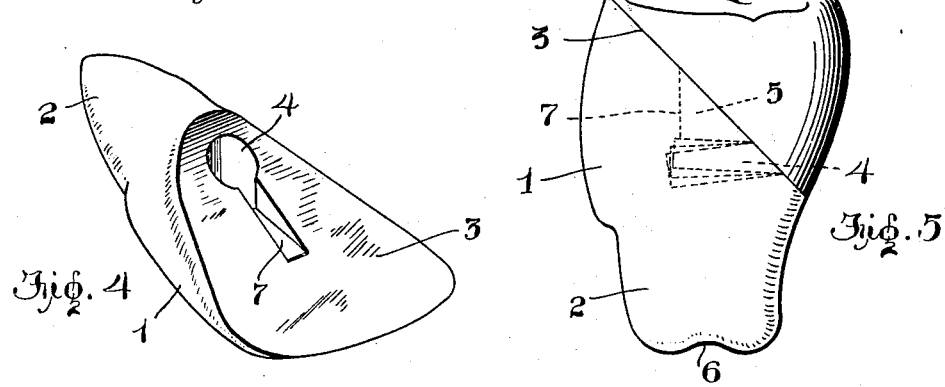
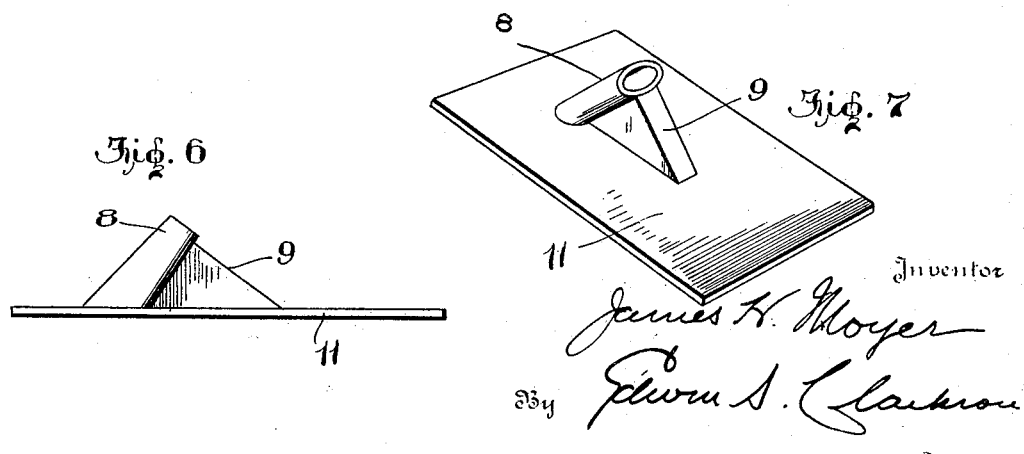
Inventor
James H. Moyer
By Edwin S. Clarkson
Attorney Patented Nov. 11, 1930

1,780,979

UNITED STATES PATENT OFFICE

JAMES H. MOYER, OF COLUMBUS, OHIO, ASSIGNOR TO THE COLUMBUS DENTAL MANUFACTURING COMPANY, OF COLUMBUS, OHIO, A CORPORATION

ARTIFICIAL PORCELAIN ROOT TOOTH

Application filed July 12, 1923. Serial No. 651,146.

The objects of my invention are to provide an interchangeable artificial tooth having as an integral part thereof an artificial root, said root and tooth being made of porcelain or any other suitable material. Also to provide a certain combination of fastenings for attaching the tooth to its backing, the said novel combination of fastenings being such that the tooth will lend itself readily to manufacture both in the molding and standardization processes.

Heretofore the dentist has been obliged to add porcelain roots to other types of teeth and facings as is supplied by the manufacturers, which addition of said porcelain root required that the dentist have exceptional skill in the art of handling porcelain from its finely powdered state to its glazed or fused state on the said manufactured tooth or facing. The dentist further was obliged to maintain an expensive equipment for doing said porcelain work, together with the disadvantage of the consumption of much time both for the dentist and the patient. Sometimes the dentist sent his porcelain work to a laboratory, said laboratory constructing the porcelain article according to the dentist's instructions. The latter method had many disadvantages in that the dentist was obliged to take with difficulty many accurate impressions, thus a hardship on both the operator and the patient, and although the dentist gave his instructions carefully to the laboratory, there were many chances for error and often the work was returned to the dentist very unsatisfactory.

Whereas with my invention the dentist can procure a tooth that will approximately fit a given case, then by a small amount of grinding, perfect the root to exact adaptation. Since it is imperative that nothing but glazed porcelain be in contact with the tissues, it is a simple operation to add a small amount of low fusing porcelain as a veneer over the said ground portion of the root and bake said veneer to a glaze. It can readily be seen that this is a time saver for the dentist and patient, and the dentist need not be skilled in the art of porcelain work to accomplish ideal results. If the dentist does not wish to maintain an expensive equipment he may have the laboratory bake the veneer with equally as good results.

Further, many teeth will not lend themselves practically to the processes of standardization required in manufacturing an interchangeable artificial porcelain tooth. Since it is a fact that dental porcelain shrinks, warps and changes shape to a considerable extent during the baking process it is necessary to grind to a standard of interchangeability all of those surfaces of the porcelain tooth that come in contact with the metal backing, if true interchangeability is to be obtained. Since, further it is a fact that porcelain is extremely abrasive on grinding equipment and necessitates constant and diligent inspection to keep said equipment running true, it is obvious that simplicity in construction of those parts of said tooth that come in contact with the metal backing must be rigidly adhered to. In my tooth there is but one flat plane, one post hole and one slot, all disposed in such relation to each other that they lend themselves readily to the grinding operations necessary to standardization and that these said parts are of such shape and contour that they can be ground and maintain therein an article truly interchangeable.

In the drawing:

Fig. 1 is a side view of an anterior tooth,

Fig. 2 is a side view of the backing,

Fig. 3 is a lingual view of an anterior tooth,

Fig. 4 is a perspective of an anterior tooth,

Fig. 5 is the application of the invention to a bicuspid,

Fig. 6 is a side view of a modification of the backing having a tapered post,

Fig. 7 is a perspective of a modification of a backing having in cross section an oblong post.

In Fig. 1, numeral 1 is the crown portion of the artificial tooth, 2 is the root portion of said tooth, 3 is a flat plane extending from a point on the lingual surface of the tooth near the juncture of the root portion with the crown portion in an incisal direction. Said flat plane being divergent to the long axis of the tooth and line X, Y, from the incisal edge portion toward the root portion of the tooth.

The post hole 4 may be a cylindrically shaped post hole having its orifice substantially near the root end of the flat plane 3, (see Fig. 3) and medianly disposed therein. The said post hole 4 extends from the said flat plane 3 to a point substantially within the labial half of the tooth and may terminate at or beyond the inner wall 7 of the slot 5, and said post hole 4 is of one diameter through its entire length, its axis being disposed labially and incisally at an angle of about 45° to the flat plane 3, yet it may enter the tooth at any other angle to the said flat plane.

The slot 5 is of less diameter than the post hole 4, (see Fig. 3) has parallel sides and is substantially triangular in longitudinal section. One leg of the triangle substantially coincides with the periphery of the post hole 4, the hypotenuse substantially coincides with the flat plane 3, the second leg 7 extends from a point near or at the extremity or innermost end of the post hole 4 at right angles (although it may be any other angle) to the said post hole to a point substantially within the incisal half on plane 3, (see Fig. 3) and medianly disposed therein. The slot 5 therefore communicates with and opens onto the flat plane 3 throughout the entire length of the hypotenuse of the triangle and the slot communicates with and opens into the post hole 4 throughout the entire length of the one leg of the triangle.

Fig. 5 is the posterior application showing a bicuspid having a saddle effect 6 on the root end, the post hole 4 and the inner wall 7 of the slot may be disposed either equal to, greater than or less than a right angle, as shown in dotted lines.

The backing as shown in Fig. 2 consists of the post 8 and rib 9 which are integral and the flat plate or member 11; the post 8 is cylindrically shaped of one diameter and may be solid or tubular, the rib 9 is formed as an integral part of the post 8. The post 8 and the rib 9 are made to fit respectively into the post hole 4 and slot 5 of the tooth, and said post and rib are riveted at 10 and/or soldered to a flat member 11.

Fig. 6 is a modification showing a one piece backing having a tapered post 8, rib 9 and flat portion 11.

Fig. 7 shows another modification of a backing having an oblong post 8 in cross section said post being constructed either solid or tubular, a rib 9 and flat member 11. This may be either a one piece or two piece backing.

Any modification of the shape of the post 8 will necessarily require a similarly shaped post hole 4 in the tooth.

It may in some instances not be necessary to grind the flat plane the full width of the tooth in one dimension, because it is necessary during the molding of the tooth to give a slight draft to the mold and this will produce the greatest width of the tooth at a more labial point than the lateral borders of the flat plane. Therefore, the flat plane may extend in one dimension the full width of the tooth, or substantially the full width of the tooth, hence the term "full width" in the claims will be construed accordingly.

What I claim is:

1. An artificial tooth having a root and a crown portion, and a flat plane extending the full width of the tooth in one dimension, and from the incisal end to the lingual surface of the root portion near the juncture of the crown and root portions in the other dimension, a post hole extending from the flat plane to a point within the labial half of the crown portion with its axis disposed labially and incisally at an angle to the flat plane, and a slot triangular in longitudinal section in the crown portion communicating with and opening onto said flat plane throughout the length of the hypotenuse of the triangle, said slot also communicating with and opening into said post hole throughout the length of one leg of the triangle.

2. An artificial tooth having a root and a crown portion and a flat plane extending the full width of the tooth in one dimension, and from the incisal end to the lingual surface of the root near the juncture of the root and crown portions, in the other dimension, a post hole extending from the said flat plane to a point within the labial half of the crown with its axis disposed labially and incisally at an angle to the flat plane, and a slot triangular in longitudinal section in the crown portion, one leg of the triangle coinciding with the periphery of the post hole, the hypotenuse coinciding with the flat plane, the second leg extending from a point near the innermost end of the post hole in an angle thereto to a point substantially within the incisal half on the said flat plane and medianly disposed therein.

3. An artificial tooth having a root and a crown portion and a flat plane extending the full width of the tooth in one dimension, and from the incisal end to the lingual surface of the root near the juncture of the root and crown portions, in the other dimension, a post hole extending from the said flat plane to a point within the labial half of the crown with its axis disposed labially and incisally at an angle to the flat plane, and a slot triangular in longitudinal section in the crown portion, one leg of the triangle coinciding with the periphery of the post hole, the hypotenuse coinciding with the flat plane, the second leg extending from a point near the innermost end of the post hole in an angle thereto to a point substantially within the incisal half on the said flat plane and medianly disposed therein, and a backing for said plane provided with a tenon complemental to the bore and slot.

In testimony whereof I affix my signature.

JAMES H. MOYER.